United States Patent [19]
Sato

[11] 3,896,788
[45] July 29, 1975

[54] DOPPLER EFFECT BLOOD FLOW METER

[75] Inventor: Yutaka Sato, Nara, Japan

[73] Assignee: Hitachi Medical Corporation, Tokyo, Japan

[22] Filed: Dec. 28, 1973

[21] Appl. No.: 429,293

[30] Foreign Application Priority Data
Jan. 22, 1973 Japan.............................. 48-10671

[52] U.S. Cl. ........ 128/2.05 F; 128/2.05 Z; 73/67.7; 73/194 A
[51] Int. Cl.............................................. A61b 5/02
[58] Field of Search............ 128/2.05 F, 2.05 Z, 2 V, 128/24 A; 73/194 A, 67.7

[56] References Cited
UNITED STATES PATENTS
| | | | |
|---|---|---|---|
| 2,826,912 | 3/1958 | Kritz................... | 73/194 A |
| 3,220,248 | 11/1965 | Wood.................. | 73/67.7 |
| 3,624,744 | 11/1971 | Munger............................ | 128/2.05 Z |
| 3,675,192 | 7/1972 | Fahrbach........................... | 73/194 A |
| 3,710,792 | 1/1973 | Light............................... | 128/2.05 F |
| 3,732,532 | 5/1973 | Flaherty et al. ................. | 128/2.05 F |

FOREIGN PATENTS OR APPLICATIONS
187,215   11/1966   U.S.S.R. ......................... 128/2.05 Z

Primary Examiner—Richard A. Gaudet
Assistant Examiner—Lee S. Cohen
Attorney, Agent, or Firm—Wenderoth, Lind & Ponack

[57] ABSTRACT

A Doppler effect blood flow meter. The flow meter has dual filters having a sharp filtering property capable of dividing ultrasonic waves reflected from blood corpuscles into frequency groups above and below ultrasonic waves emitted by a probe in the blood vessels thereby detecting the blood velocity and the blood flow and detecting the direction of the blood flow based on the theory of the Doppler effect.

5 Claims, 3 Drawing Figures

PATENTED JUL 29 1975　　3,896,788
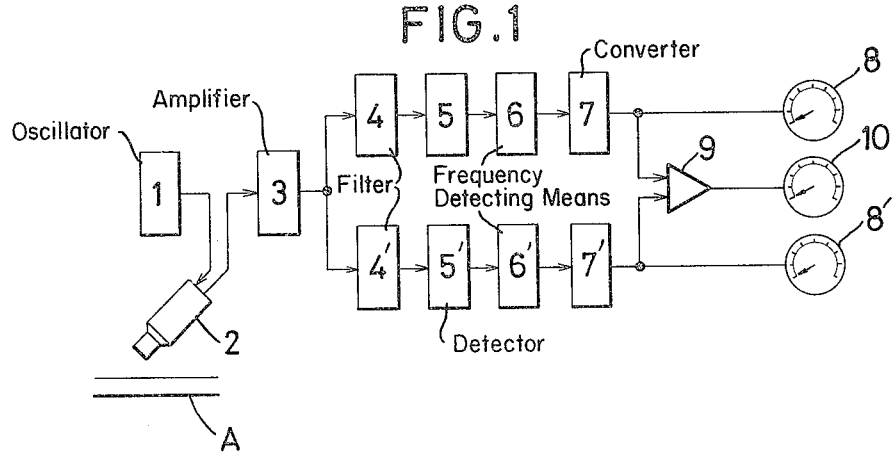
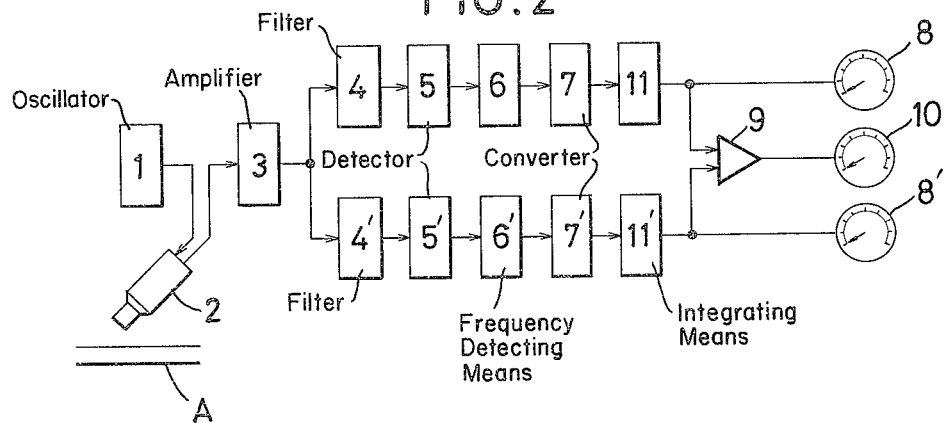
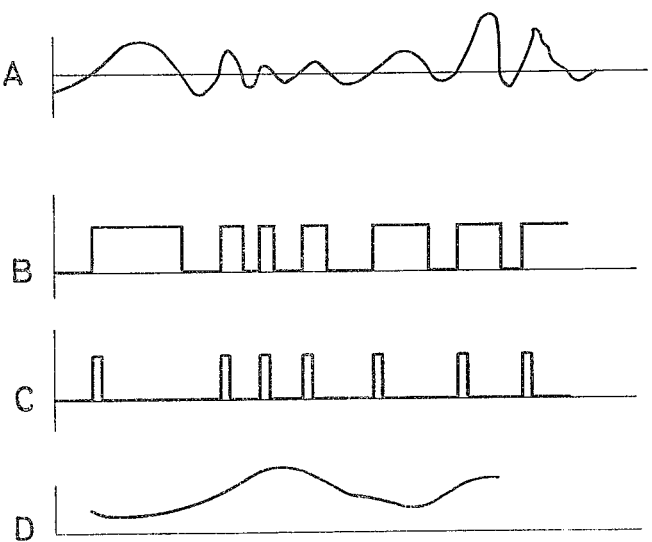

ic waves into
DOPPLER EFFECT BLOOD FLOW METER

The present invention relates to a Doppler effect blood flow meter and in particular a Doppler effect blood flow meter adopting a dual-filter method.

Conventionally, Doppler effect blood flow meters have been used, said blood flow meters emitting ultrasonic waves toward blood vessels at a required angle relative to the blood vessels, receiving ultrasonic waves reflected therefrom and thereby detecting the velocity and direction of the blood flow by the theory of the Doppler effect. The Doppler effect provides that when the blood is flowing toward a probe, the frequency of ultrasonic waves reflected from the blood corpuscles and received by said probe is higher than that of ultrasonic waves emitted to the blood vessels from the probe, and vice versa, no change of the frequency being observed when the blood is stationary as a matter of course. The degree of difference in the frequency depends, of course, on the velocity of the blood.

However, conventional apparatus of this kind, using the phase shift method, are defective in various regards. They need, for instance, complex circuits for detecting the change of frequency in the afore-described operation, said complex circuits still being incapable of perfectly detecting every minute change of said frequency as there is a possibility of miscellaneous waves existing in the process of the detecting operation, e.g., possible infiltration of ultrasonic waves reflected from other than the blood corpuscles such as the stationary parts of the human body; possibly uneven velocity of blood corpuscles in a blood vessel; and the like.

A main purpose of the present invention is to obviate said defects of conventional apparatus of this kind by means of incorporating dual filters having sharp filtering characteristics, said filters being capable of dividing the reflected ultrasonic waves in groups above and below the emitted ultrasonic waves in frequency, and thereafter detecting the amplitude of the reflected ultrasonic waves thereby figuring out the velocity of the blood and the blood flow in the vessels from the detected frequency and also discriminating the direction of the blood flow in each group.

The embodiment of the present invention will be apparent from the illustrations given in relation with the annexed drawing as following:

(The blood flow meter in the present invention incorporates dual devices available for the aforementioned groups divided by the filters, one group as the plus (+) side and the other group as the minus (−) side, said dual devices being designated by numerals ranging from 4 to 11 except 9 and 10 in the drawing.)

FIG. 1 is a block diagram of a blood flow meter in the present invention for detecting the velocity and direction of the blood flow.

FIG. 2 is a block diagram of a blood flow meter in the present invention for detecting the blood flow and its direction.

FIG. 3 is a wave form chart visualizing the process of detecting the blood velocity by a detector shown in FIG. 1.

In FIG. 1, numeral 1 designates a high-frequency oscillator and numeral 2 designates a probe which receives high frequency from the high-frequency signals oscillator 1. The probe emits, to the blood vessels A at a suitable angle, ultrasonic waves equivalent in frequency to the above-said high frequency signals, and receives ultrasonic waves reflected from the blood corpuscles, converting the reflected ultrasonic waves into electric current as its own output.

Numeral 3 designates an amplifier, and 4, 4' designate filters having sharp filtering properties for dividing the reflected ultrasonic waves into groups above and below the emitted ultrasonic waves in frequency, allowing the passage of ultrasonic waves only within a narrow realm of their own frequency area. It is usual that, when the frequency of the emitted ultrasonic waves is 5,000 KH$_z$, there is a frequency change of ± 5 KH$_z$ or less thereto or therefrom, and said filters in the present invention are so designed as to allow the passage of the frequency change within ± 7 KH$_z$, the value 7 Khz being considered to be the maximum to be seen in the change of the frequency between ultrasonic waves emitted and reflected by a probe to and from the blood corpuscles. Thus said filters effectively prevent the infiltration of ultrasonic waves or any other miscellaneous signals reflected from anything other than the blood corpuscles. Crystal filters developed and used by the radio communicating art have proven to be quite fit for the above-described purpose.

Numerals 5, 5' designate amplitude detectors, which are coupled to and detect output of the filters 4, 4' in an envelope of wave form.

Numerals 6, 6' designate frequency detecting means consisting of a Schmidt trigger circuit and a monostable multi-vibrator circuit or any other circuits equivalent to the above circuits in efficiency, said Schmidt trigger circuit converting the output wave form of the detectors 5, 5' in FIG. 3 into rectangular waves as shown by B in the FIG. 3, said monostable multi-vibrator circuit thereby converting the rectangular waves into frequency pulses shown by C in FIG. 3.

Numerals 7, 7' designate converting means for converting the frequency into direct current voltage as shown by D in FIG. 3, said purpose being accomplished by a low-pass circuit consisting of a condenser and a resistor.

Numerals 8, 8' designate indicators for indicating the output of the above-described converters 7, 7', one of the indicators 8, 8' indicating the velocity and also the direction of the blood flow if the blood flow is fixed in one direction, and otherwise, difference of numerical values between the plus-side and the minus-side is figured out by subtracting the smaller figure from the bigger figure, the difference being indicated in a single indicator designated by numeral 10 in the drawing by applying the output of the convertors 7, 7' to a differential amplifier designated by numeral 9 in the drawing, thereby transferring it to said indicator 10.

In FIG. 2, numerals 11, 11' designate operation circuits for integrating the output of the convertors 7, 7', the velocity of the blood, in FIG. 1 over the sectional area of the blood vessels thereby enabling the blood flow meter in FIG. 1 to also indicate the blood flow.

The present invention as illustrated in the foregoing embodiment may be utilized in other embodiments by means of incorporating other circuits equivalent in efficiency to the above-described circuits.

What is claimed is:

1. An improved Doppler effect blood flow meter for determining velocity and blood flow direction comprising a high frequency oscillator which generates a high frequency signal, a probe means coupled to said high frequency oscillator for transmitting the high frequency signal toward blood vessels and for receiving said high frequency signal after reflection thereof by blood corpuscles, said received signal being Doppler shifted in frequency, two filter means operatively coupled in parallel to said probe means, said filter means having sharp filtering characteristics capable, respectively, of dividing the high frequency waves reflected from blood corpuscles into frequency ranges above and below the frequency of said transmitted signal, indicative of blood flow toward and away from said probe means, means operatively coupled to each said filter means for producing an output wave indicative of the frequency of the received signal, and output means coupled to said output wave producing means for indicating the velocity and direction of blood flow.

2. The device of claim 1 further comprising an amplifier interposed between said probe means and said parallel filter means.

3. The device of claim 2 wherein each said output wave producing means is comprised of an amplitude detector coupled to one of said filter means, a frequency detecting means coupled to said amplitude detector and producing frequency pulses, and means coupled to said frequency detecting means for converting the output of said frequency detecting means into a direct current voltage.

4. The device of claim 3 wherein said output means is comprised of a plurality of indicators, one coupled to each converting means for indicating velocity and direction of blood flow in one of a direction approaching and withdrawing from said probe means, depending on the associated filter means, a differential amplifier coupled to the output of said at least two converting means, and an indicator coupled to the output of said differential amplifier, whereby the last-noted indicator will produce an accurate output when blood flows in one direction or in opposite directions.

5. The device of claim 4 further comprising integrating means interposed between each converting means and said output means.

* * * * *